United States Patent
Koh

(10) Patent No.: US 12,308,638 B2
(45) Date of Patent: May 20, 2025

(54) POWER CONDITIONING SYSTEM SUPPORTING HOT SWAPPING AND CONTROL METHOD OF POWER CONDITIONING SYSTEM

(71) Applicant: LS ELECTRIC CO., LTD., Anyang-si (KR)

(72) Inventor: Kwangsoo Koh, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 57 days.

(21) Appl. No.: 17/913,896

(22) PCT Filed: Mar. 9, 2021

(86) PCT No.: PCT/KR2021/002885
§ 371 (c)(1),
(2) Date: Sep. 23, 2022

(87) PCT Pub. No.: WO2021/194130
PCT Pub. Date: Sep. 30, 2021

(65) Prior Publication Data
US 2024/0213762 A1 Jun. 27, 2024

(30) Foreign Application Priority Data
Mar. 23, 2020 (KR) .................. 10-2020-0035126

(51) Int. Cl.
*H02H 7/122* (2006.01)
*H02J 1/00* (2006.01)
(Continued)

(52) U.S. Cl.
CPC .............. *H02J 1/001* (2020.01); *H02H 7/122* (2013.01); *H02J 3/38* (2013.01); *H02M 1/36* (2013.01); *H02M 7/003* (2013.01); *H02M 7/493* (2013.01)

(58) Field of Classification Search
CPC .. H02J 1/001; H02J 3/381; H02J 5/00; H02M 1/36; H02M 7/493; H02M 7/003; H02H 7/122; H02H 3/38
See application file for complete search history.

(56) References Cited

U.S. PATENT DOCUMENTS

2016/0174392 A1* 6/2016 Miyake .................... B60L 53/80
318/681
2017/0358921 A1* 12/2017 Ito ......................... H02H 7/1227
(Continued)

FOREIGN PATENT DOCUMENTS

EP          3484042 A1     5/2019
KR     2020140005357 U     10/2014
(Continued)

OTHER PUBLICATIONS

International Search Report for related International Application No. PCT/KR2021/002885; report dated Sep. 30, 2021; (6 pages).
(Continued)

*Primary Examiner* — Alex Torres-Rivera
(74) *Attorney, Agent, or Firm* — K&L Gates LLP

(57) ABSTRACT

The present disclosure relates to a power conditioning system comprising: a converter including a plurality of inverters formed in the form of power electronics building blocks (PEBBs); and a system control unit for: controlling the plurality of inverters such that the plurality of inverters are driven independently of each other; receiving status information from each of the plurality of PEBBs and detecting a specific PEBB requiring maintenance according to the received status information; when the specific PEBB is detected, deactivating an inverter of the specific PEBB separately from the remaining PEBBs; and controlling the
(Continued)

driving of the remaining PEBBs such that the power conditioning system continuously operates while the specific PEBB is inactive.

11 Claims, 5 Drawing Sheets

(51) Int. Cl.
  *H02J 3/38* (2006.01)
  *H02M 1/36* (2007.01)
  *H02M 7/00* (2006.01)
  *H02M 7/493* (2007.01)

(56) References Cited

U.S. PATENT DOCUMENTS

2018/0097452 A1* 4/2018 Chapman .............. H02M 7/493
2021/0067055 A1* 3/2021 Koh ....................... H02J 9/066

FOREIGN PATENT DOCUMENTS

KR   101627510 B1   6/2016
KR   102032157 B1   10/2019
WO   2018145748 A1   8/2018

OTHER PUBLICATIONS

Written Opinion for related International Application No. PCT/KR2021/002885; report dated Sep. 30, 2021; (6 pages).
Office Action for related Korean Application No. 2020-0035126; action dated Dec. 12, 2022; (4 pages).

* cited by examiner (a)

(b)

(c)

POWER CONDITIONING SYSTEM SUPPORTING HOT SWAPPING AND CONTROL METHOD OF POWER CONDITIONING SYSTEM

CROSS-REFERENCE TO RELATED APPLICATION

The present application is a National Stage of International Application No. PCT/KR2021/002885 filed on Mar. 9, 2021, which claims priority to and the benefit of Korean Utility Model Application No. 10-2020-0035126, filed on Mar. 23, 2020, the disclosure of which is incorporated herein by reference in its entirety.

FIELD

The present disclosure relates to a power conditioning system (PCS) and a method of controlling the power conditioning system.

BACKGROUND

In recent years, with the advent of a small-scale power generation system using a new and renewable energy source, various power generation systems such as wind power, solar power, a fuel cell, small hydro power, a gas engine, and a gas turbine are connected to a distribution grid. As such, power sources connected to a distribution grid are referred to as distributed energy resources (DER), and various types of different distributed power sources may be directly or indirectly connected to the electrical equipment, that is, loads, of the distribution grid to supply operating power.

On the other hand, when such distributed power sources are connected to a distribution grid as described above, a DC current supplied from a distributed power source must be converted into an AC current required by the distribution grid and supplied to the distribution grid. To this end, a distributed power source may be connected to a distribution grid through a power conditioning system (PCS), and the power conditioning system may convert an input DC current into an AC current and supplied to the distribution grid using a modulation method such as pulse width modulation (PWM).

Meanwhile, the power conditioning system may include a plurality of inverters to switch the on/off of the plurality of inverters at high speed, thereby converting a DC current into an AC current of a specific voltage.

On the other hand, in the case of a power conditioning system in the related art, such a plurality of inverters are integrally provided therein. Accordingly, even when a failure occurs in any one of the inverters, the operation of an entire power conditioning system must be stopped, and accordingly, there is a problem in that the supply of a current to the distribution grid is stopped while the power conditioning system is repaired. In addition, as the plurality of inverters are integrally disposed as described above, it is required to stop the operation of the entire inverters in order to check a specific inverter, and there is a problem in that for the maintenance of a specific inverter, the operation of the power conditioning system must be stopped or the maintenance is enabled only during a time period when a current is not supplied to the distribution grid from a distributed power source (e.g., at night-time when the distributed power source is solar power generation).

SUMMARY

The present disclosure is contrived to solve the foregoing problems, and an aspect of the present disclosure is to provide a power conditioning system capable of allowing the maintenance or replacement of an inverter without stopping the operation of the power conditioning system, and a method of controlling the power conditioning system.

In addition, another aspect of the present disclosure is to provide a power conditioning system capable of replacing only at least some of a plurality of inverters provided in the power conditioning system, and easily and quickly replacing at least some of the plurality of inverters, that is, in a hot swap manner, and a method of controlling the power conditioning system.

In order to achieve the foregoing and other objectives, according to an aspect of the present disclosure, a power conditioning system according to an embodiment of the present disclosure may include a converter including a plurality of inverters disposed in the form of power electronics building blocks (PEBBs), and a system controller that controls the plurality of inverters to operate the plurality of inverters independently of one another, receives state information from each of the plurality of PEBBs, detects a specific PEBB requiring maintenance according to the received state information, deactivates an inverter of the specific PEBB separately from the remaining PEBBs when the specific PEBB is detected, and controls the operation of the remaining PEBBs to continuously operate the power conditioning system while the specific PEBB is deactivated.

According to an embodiment, the converter may include a first bay and a second bay each including a plurality of sockets, wherein the PEBB includes a first plug unit coupled to a first socket of the first bay, a second plug unit coupled to a second socket of the second bay, and an inverter that converts a DC current input through the first plug unit coupled to the first socket into an AC current, and outputs the converted AC current through the second socket coupled to the second plug unit.

According to an embodiment, the first plug unit and the second plug unit may have different forms according to sockets corresponding thereto.

According to an embodiment, each socket may further include a locking device capable of fixing the coupling state of plug units coupled thereto, wherein when the specific PEBB is deactivated, the system controller controls a locking device of sockets coupled to the plug units of the specific PEBB to release a locked state so as to separate the plug units of the specific PEBB from the respective sockets.

According to an embodiment, when the specific PEBB is deactivated, the system controller may detect whether a current stored in the inverter of the deactivated specific PEBB is discharged, and control the locking device to release the locked state when the current is discharged.

According to an embodiment, the system controller may determine whether the current stored in the inverter of the deactivated specific PEBB is discharged based on whether a predetermined time period has elapsed from a time point when the specific PEBB is deactivated.

According to an embodiment, the PEBB may further include a first circuit breaker unit between the first plug unit and the inverter to cut off a current input from the first plug unit, and a second circuit breaker unit between the inverter and the second plug unit to cut off a current output from the inverter, wherein when the specific PEBB is detected, the system controller controls the first circuit breaker unit and the second circuit breaker unit of the specific PEBB to cut off the specific PEBB from the converter.

According to an embodiment, the converter may further include a DC current circuit breaker unit capable of cutting off a DC current supplied to the converter from a DC power source, and an AC current circuit breaker unit capable of cutting off the output of an AC current converted by the converter.

According to an embodiment, while the specific PEBB is deactivated, the system controller may correct an output command of the remaining PEBBs based on a number of the remaining PEBBs other than the specific PEBB and an AC output during the normal operation of the converter to compensate the operation of the deactivated PEBB.

In order to achieve the foregoing and other objectives, according to an aspect of the present disclosure, a method of controlling a power conditioning system having a converter including a plurality of inverters in the form of power electronics building blocks (PEBBs) may include receiving state information from each of the plurality of PEBBs, detecting a specific PEBB requiring maintenance based on the received plurality of state information, stopping the operation of the specific PEBB to deactivate the specific PEBB, correcting an output command of the remaining PEBBs for the operation based on a number of the remaining PEBBs other than the specific PEBB and an AC output during the normal operation of the converter while the specific PEBB is deactivated, and restoring the output command of the remaining PEBBs when the replacement of the specific PEBB is completed.

According to an embodiment, the deactivating of the specific PEBB may further include detecting whether a current stored in an inverter of the specific PEBB is discharged, and displaying the specific PEBB to be distinguished from the other PEBBs according to whether the stored current is discharged to indicate that the specific PEBB is in a replaceable state.

According to an embodiment, the detecting of whether the stored current is discharged may be the detecting of whether a predetermined time period has elapsed since a time point when the specific PEBB is deactivated.

According to an embodiment, the PEBB may include a first plug unit and a second plug unit, an inverter that converts a DC current input through the first plug unit into an AC current, and outputs the converted AC current through the second plug unit, a first circuit breaker unit between the first plug unit and the inverter to cut off a current input from the first plug unit, and a second circuit breaker unit between the inverter and the second plug unit to cut off a current output from the inverter, wherein the deactivating of the specific PEBB further includes the controlling of the first circuit breaker unit and the second circuit breaker unit to circuitally cut off the specific PEBB from the converter.

According to an embodiment, the converter may further include a first bay including a socket coupled to the first plug unit and a second bay including a socket coupled to the second plug unit, wherein each of the sockets further includes a locking device capable of fixing the coupling state of plug units coupled thereto, and the deactivating of the specific PEBB further includes the controlling of a locking device of sockets coupled to plug units of the specific PEBB to release a locked state so as to separate the plug units of the specific PEBB from respective sockets when the specific PEBB is in a replaceable state.

The effects of a power conditioning system and a method of controlling the power conditioning system according to the present disclosure will be described as follows.

According to at least one of the embodiments of the present disclosure, respective inverters may be configured with power electronic building blocks (PEBBs) to be detachable from a power conditioning system, thereby having an effect of allowing at least one inverter to be replaced due to an inspection for maintenance or a failure so as to be easily and quickly separated therefrom.

Furthermore, according to at least one of the embodiments of the present disclosure, respective inverters may be driven independently of one another such that, even when some inverters are separated, the remaining inverters can be normally driven, and also the remaining inverters that are normally driven perform a compensatory operation for the separated some inverters, thereby having an effect capable of supplying an AC current to a distribution grid without the deactivation or degradation of performance of a power conditioning system even when the some inverters are separated therefrom.

In addition, according to at least one of the embodiments of the present disclosure, the present disclosure may include a plug in which a PEBB including each inverter can be coupled to a preset socket, and a converter in a power conditioning system according to an embodiment of the present disclosure may be configured to include a bay including sockets into which the PEBB plug can be inserted. Accordingly, the inverter of each PEBB may be mounted to or separated from the converter of the power conditioning system through the plug of the PEBB and the socket of the bay, thereby having an effect of allowing the inverter to be more easily and quickly detachable.

DETAILED DESCRIPTION

Figure 1:
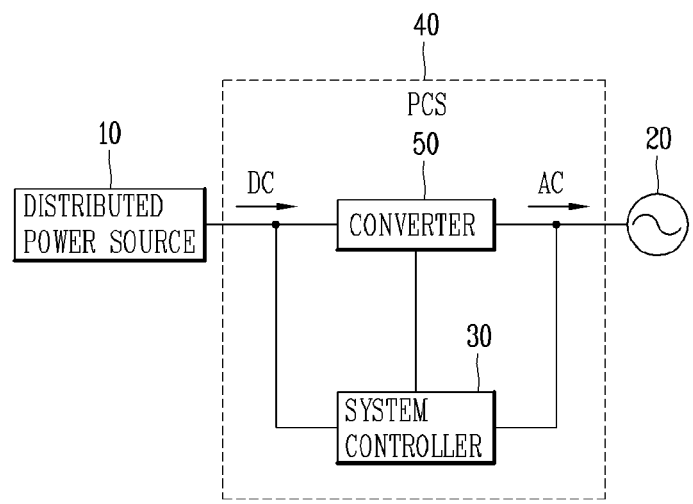
FIG. 1 is a block diagram illustrating a configuration of a power conditioning system including a converter.

Hereinafter, the embodiments disclosed herein will be described in detail with reference to the accompanying drawings, and the same or similar elements are designated with the same numeral references regardless of the numerals in the drawings and their redundant description will be omitted. A suffix "module" or "unit" used for elements disclosed in the following description is merely intended for easy description of the specification, and the suffix itself does not give any special meaning or function. In describing the embodiments disclosed herein, moreover, the detailed description will be omitted when specific description for publicly known technologies to which the disclosure pertains is determined to obscure the gist of the embodiments disclosed herein. Furthermore, the accompanying drawings are provided only for a better understanding of the embodiments disclosed herein and are not intended to limit technical concepts disclosed herein, and therefore, it should be understood that the accompanying drawings include all modifications, equivalents and substitutes within the concept and technical scope of the present disclosure.

FIG. 1 is a block diagram illustrating a configuration of a power conditioning system including a converter.

Typically, a grid-connected power conditioning system (grid-connected inverter), which is a power source connected to a distribution grid 20, that is, a distributed power source, may include an energy storage system (ESS), solar power, wind power, a fuel cell, and the like. A dual energy storage system is a system that stores the power of the distribution grid 20 in a battery or the surplus power of the distribution grid 20 in a battery. On the other hand, power generated from a new and renewable energy generation system such as solar power or wind power may be used to improve the stability or supply reliability of a grid in connection with the distribution grid 20.

Such a grid-connected power conditioning system may perform frequency adjustment by charging active power when the frequency increases due to a load change and discharging active power when the frequency decreases. In addition, the grid-connected power conditioning system may function as a reactive power compensation system for suppressing power factor change, preventing instantaneous voltage fluctuation, and operating as an active filter to remove harmonics.

The grid-connected power conditioning system performs a dynamic grid support and static grid support operation to prevent the proliferation of accidents in a grid and to stabilize the grid in a distributed power system including such a distributed power source. Dynamic grid support is a requirement for fault ride through (FRT), and static grid support is a requirement for active/reactive power, and fixed reactive power or reactive power depending on fixed power factor, grid voltage or active power must be supplied.

The power conditioning of such a grid-connected power conditioning system mainly uses an insulated gate bipolar transistor (IGBT) element to convert power in both directions, and uses a filter at an AC terminal to remove harmonics of an output current.

To this end, a grid-connected power conditioning system 40 includes a converter 50, and is configured to include a system controller 30 that controls an overall operation of the power conditioning system 40. The power conditioning system 40 may receive a DC current from a distributed power source 10, convert the received DC current into an AC current, and supply the converted AC current to the distribution grid 20. Furthermore, the power conditioning system 40 may be configured to further include a human machine interface (HMI) or a power monitoring system.

Meanwhile, the converter 50 of the power conditioning system 40 may include a plurality of inverters. Furthermore, the plurality of inverters may be implemented as a plurality of power electronics building blocks (PEBBs) to be independently activated or operated. As such, when the plurality of inverters are implemented as a plurality of PEBBs, the power conditioning system 40 may be defined in a modular form to facilitate capacity expansion and reduce production cost. In addition, only some of the PEBBs may be selectively operated to increase system operation efficiency.

In the following description of the present disclosure, it will be described on the assumption that the power conditioning system 40 is configured to include a plurality of PEBBs, such that only some of the PEBBs with detected failures or requiring maintenance may be selectively detached.

Figure 2:
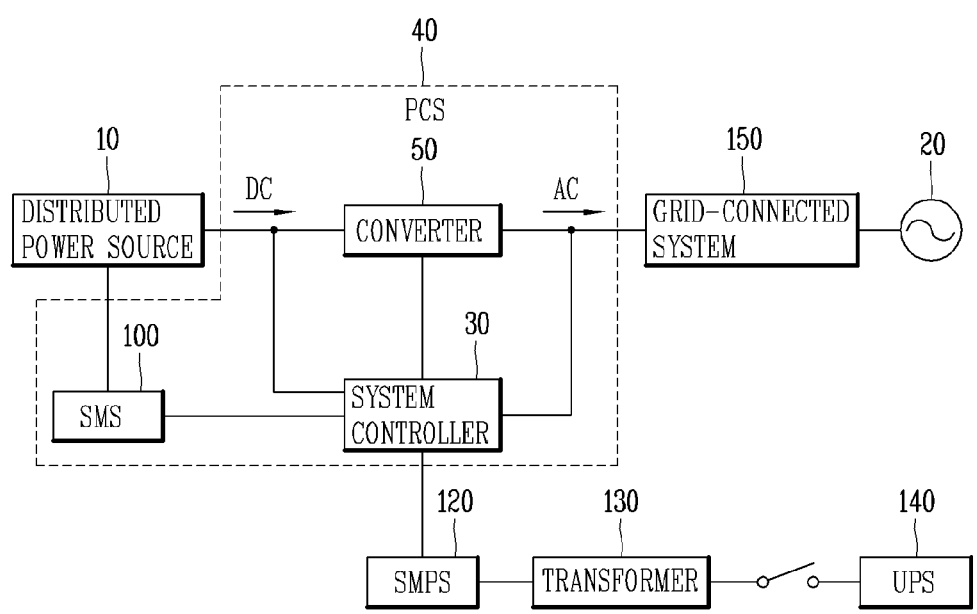
FIG. 2 is a block diagram illustrating a configuration of a power conditioning system including a converter to which a plurality of inverters implemented in the form of PEBBs are coupled according to an embodiment of the present disclosure.

FIG. 2 is a block diagram illustrating a configuration of a power conditioning system including a converter having a plurality of inverters implemented in the form of PEBBs according to an embodiment of the present disclosure.

Referring to FIG. 2, the power conditioning system 40 according to an embodiment of the present disclosure may be connected to the distributed power source 10 and the distribution grid 20, and configured to include a converter 50 that converts a direct current supplied from the distributed power source 10 into an AC current, a source management system (SMS) 100, a system controller 110.

Meanwhile, the components of the power conditioning system 40 illustrated in FIG. 2 are not essential components of the power conditioning system 40, thus the power conditioning system 40 may of course include a larger or smaller number of components than the number of components illustrated in FIG. 2.

First, the distributed power source 10 may denote at least one of various power generation systems capable of generating electric power such as a renewable energy power generation system such as wind power, solar power, or small hydro power, a fuel cell, a gas engine, or a gas turbine, as described above. In addition, a battery system such as an energy storage system (ESS) may also be a distributed power source that can supply a current to a distribution grid.

Furthermore, the converter 50 may convert a DC current supplied from the distributed power source 10 into an AC current having a voltage required by the distribution grid 20. Furthermore, the converted current may be supplied to the distribution grid 120 through a grid-connected system 150. Furthermore, the SMS 100 may monitor the state of the connected DC current source, that is, the distributed power source 10 in real time, and provide the monitored result to the system controller 30.

Meanwhile, the system controller 30 may control an overall operation of the power conditioning system 40. First, the system controller 30 may be connected to an input terminal and an output terminal of the converter 50 of the power conditioning system 40, respectively, to detect a DC current input to the converter 50 and an AC current output from the converter 50. Furthermore, the operation of the converter 50 may be controlled based on the detected AC current. For an example, when a voltage of an AC current is higher or lower than a voltage required for the distribution grid 20, the converter 50 may be controlled to convert an input DC current into an AC current having a lower voltage or an AC current having a higher voltage.

Meanwhile, the system controller 30 may detect an operating state of the converter 50. In this case, when the converter 50 includes a plurality of inverters configured with PEBBs as described above, the system controller 30 may check an operating state for each PEBB to detect whether a normal operation is enabled. Furthermore, when there is a PEBB in which a normal operation is disabled, a specific PEBB in which an abnormal state is detected may be displayed separately from the other PEBBs, or an abnormal state may be displayed for the specific PEBB through a monitoring system or the like. Alternatively, an alarm for indicating an abnormal state of the specific PEBB may be output as an auditory signal or a visual signal using an alarm unit or an optical output unit (not shown) such as an LED.

Meanwhile, the power conditioning system 40 according to an embodiment of the present disclosure may be connected to a system for supplying uninterruptible power, such as an uninterruptible power supply (UPS), in order to supply power during an emergency event when power supply is interrupted. To this end, a switched mode power supply (SMPS) 120 including a switching regulator for efficiently converting power and a transformer 130, a UPS 140, and the UPS 140 may be further connected thereto, and the transformer 130 may be connected through a switch to be selectively connected to the power conditioning system 40.

Figure 3:
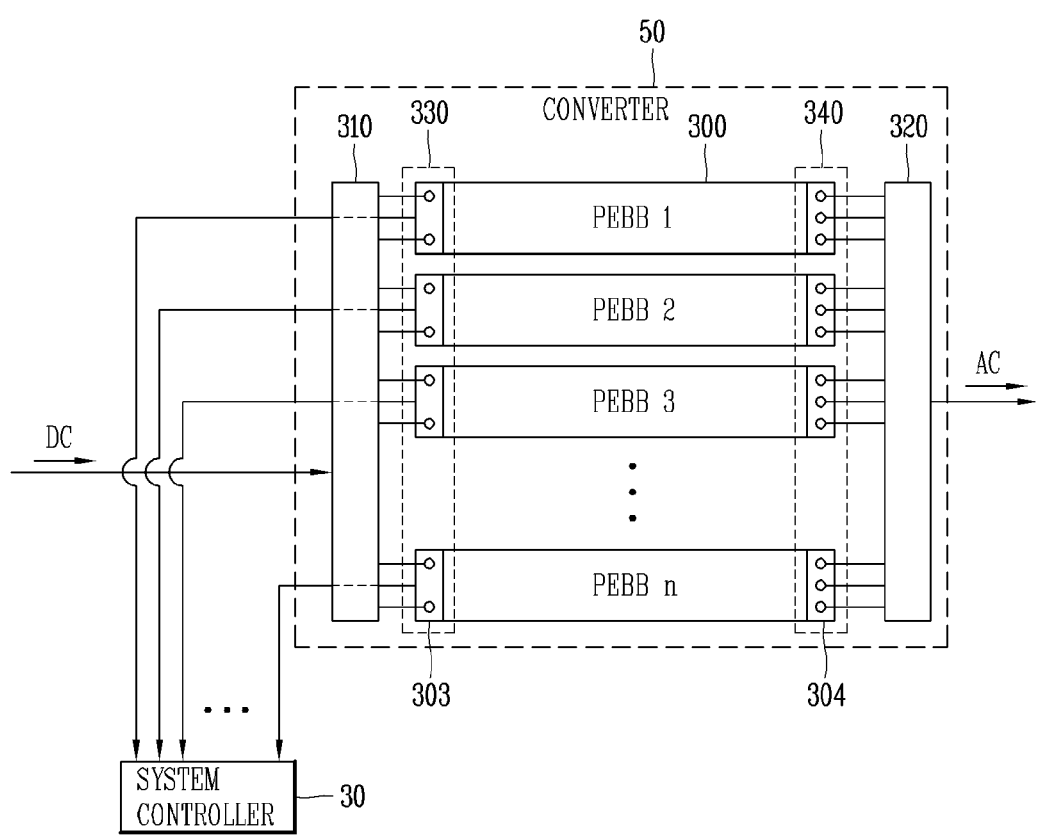
FIG. 3 is a detailed block diagram illustrating in more detail a configuration of the converter in the power conditioning system illustrated in FIG. 2.

Meanwhile, the converter 50 of the power conditioning system 40 according to an embodiment of the present disclosure may be disposed to include a plurality of PEBBs as described above. FIG. 3 is a diagram illustrating in more detail a configuration of the converter 50 including a plurality of PEBBs as described above.

Referring to FIG. 3, the converter 50 of the power conditioning system 40 according to an embodiment of the present disclosure may be disposed to include a plurality of PEBBs 300 each including a multi-level inverter. Furthermore, it may be configured to include a DC circuit breaker unit 310 for preventing the inflow of an overvoltage, and an AC circuit breaker unit 320 for preventing the output of an overvoltage.

Meanwhile, the converter 50 of the power conditioning system 40 according to an embodiment of the present disclosure may include a first bay 330 and a second bay 340 that can be coupled to the plurality of PEBBs 300. In addition, the plurality of PEBBs 300 include a first plug unit 303 and a second plug unit 304 that can be coupled to sockets disposed in the first bay 330 and the second bay 340, respectively.

For an example, the first plug unit 303 and the second plug unit 304 may be defined in the form of a pluggable connector or a fork plug that can be coupled to a socket disposed in the first bay 330 and a socket disposed in the second bay 340, respectively.

In this case, the first plug unit 303 and the second plug unit 304 may be inserted into the socket disposed in the first bay 330 and the socket disposed in the second bay 340, respectively, to allow the PEBB 300 and the converter 50 to be connected to each other, and the plug units inserted into the respective sockets may be released from the sockets to allow the PEBB 300 and the converter 50 to be separated from each other. Meanwhile, in order to prevent coupling to a socket other than the corresponding socket, the first plug unit 303 and the second plug unit 304 may have different forms.

Meanwhile, each of the sockets may include a locking device (not shown) capable of fixing the plug units coupled to the socket when the plug units are coupled thereto. In this case, the locking devices provided in the respective sockets may release a locked state under the control of the system controller 30, and when the locked state is released, the plug unit may be separated from the socket.

Meanwhile, each of the sockets of the first bay 330 may be disposed to receive a DC current from the distributed power source 10. Accordingly, each PEBB 300 may receive the DC current of the distributed power source 10 through the first plug unit 303 connected to the socket of the first bay 330. Furthermore, the inverter provided in each PEBB may perform an on/off operation according to the control of the system controller 30, and accordingly, a DC current during a time period for which an on-state is maintained may be output according to the control of the system controller 30. Then, the current output from the inverter may be output through the second plug unit 304 connected to the socket of the second bay 340, and an output current of the converter 50 may be defined according to the sum of currents output from respective PEBBs. That is, the system controller 30 may control the on-off timings of the respective inverters configured with PEBBs to define an AC current according to a pulse width modulation (PWM).

Meanwhile, the system controller 30 according to an embodiment of the present disclosure may receive operating state information from each PEBB connected for stable current conversion, and check an operating state for each PEBB based on the received operating state information to detect whether a normal operation is enabled. Furthermore, when a PEBB in which a normal operation is not enabled is detected, the system controller 30 may output an alarm for indicating the PEBB in which an abnormality is detected. To this end, the system controller 30 may be connected to each PEBB in a wireless or wired manner as shown above in FIG. 3.

Meanwhile, when there is a PEBB in which an abnormality is detected, the system controller 30 may selectively deactivate only the PEBB in which the abnormality is detected. To this end, the system controller 30 may cut off only the PEBB in which the abnormality is detected.

Furthermore, the system controller 30 may display that the PEBB in which the abnormality is detected is in a detachable state. In this case, the system controller 30 may control the locking devices of the sockets coupled to the respective plug units of PEBBs in which abnormalities are detected to release the locked states of the sockets coupled to the respective plug units of the PEBBs in which the abnormalities are detected. Accordingly, the PEBB in which the abnormality has occurred may be separated from the converter 50. In this case, the remaining PEBBs may be driven normally, thereby performing a replacement (hot swap) for the PEBB in which the abnormality is detected while the power conditioning system 40 is still driven, that is, without stopping the operation of the system.

Meanwhile, in the case of maintenance, a process similar thereto may be carried out. For example, the system controller 30 may selectively deactivate only a PEBB the maintenance deadline of which has expired or a PEBB the maintenance of which is designated by an operator. Furthermore, the deactivated PEBB may be displayed in a detachable state to separate the deactivated PEBB therefrom while performing the operation of the power conditioning system 40. In this case, the locked states of the plug units of the deactivated PEBB may be released to separate the deactivated PEBB therefrom.

Figure 4:
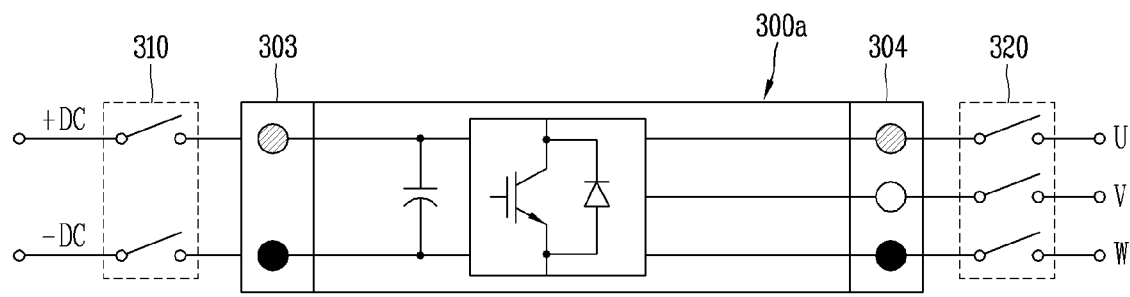
FIG. 4 is an exemplary diagram illustrating different examples of inverters implemented in the form of PEBBs according to an embodiment of the present disclosure.
Figure 4:
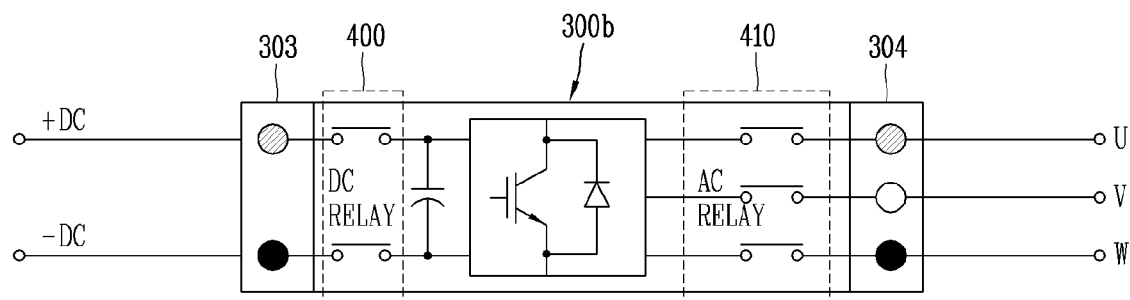
Figure 4:
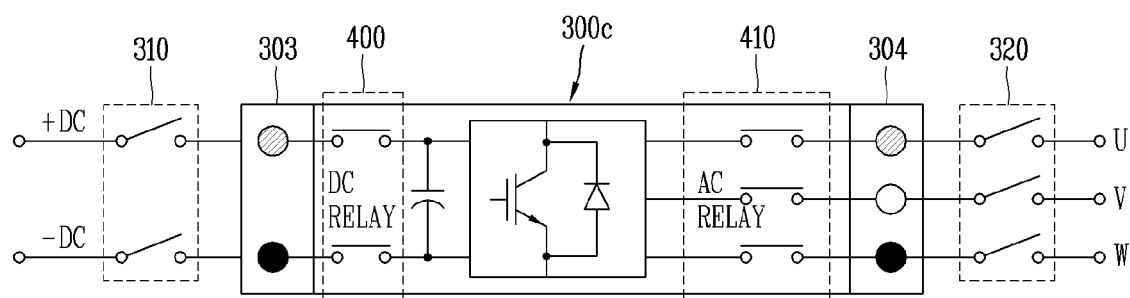

FIG. 4 is an exemplary diagram illustrating different examples of inverters implemented in the form of PEBBs according to such an embodiment of the present disclosure.

First, (a) of FIG. 4 illustrates a basic configuration of a PEBB 300a according to an embodiment of the present disclosure, in which a configuration including a multi-level inverter is illustrated, and the DC circuit breaker unit 310 disposed on two-phase electric circuits, respectively, to which a DC current is supplied, and the AC circuit breaker unit 320 disposed on three-phase electric circuits, respectively, from which an AC current is output may be disposed on both sides of the PEBB 300a.

Furthermore, as the supplied direct current is two-phase (DC+, DC−), the sockets of the first plug unit 303 and the first bay 330 may be disposed to have two plugs inserted thereinto and coupled thereto, respectively. Similarly, as the output AC current is three-phase (U, V, W), the sockets of the second plug unit 304 and the second bay 340 may be disposed to have three plugs inserted thereinto and coupled thereto, respectively.

Meanwhile, in the example illustrated in (a) of FIG. 4, an example in which the DC circuit breaker unit 310 and the AC circuit breaker unit 320 are disposed at an outside of the PEBB 300a has been described, but on the contrary, each PEBB 300b may also, of course, be disposed to include the DC circuit breaker unit and the AC circuit breaker unit. In this case, a DC circuit breaker unit 400 provided at an inside of the PEBB 300b may be disposed at an inverter input terminal of the PEBB to selectively cut off a DC current supplied to the inverter. Furthermore, an AC circuit breaker unit 410 provided at an inside of the PEBB 300b may be disposed at an inverter output terminal of the PEBB to selectively cut off an AC current output from the inverter. In this case, since the DC circuit breaker unit 400 and the AC circuit breaker unit 410 are provided at an inside of the PEBB 300b, the DC circuit breaker unit 310 and the AC circuit breaker unit 320 may not be provided at an outside of the PEBB 300b. As such, when the DC circuit breaker unit 400 and the AC circuit breaker unit 410 are provided at an inside of the PEBB 300b, the system controller 30 may control the internal DC circuit breaker unit 400 and the AC circuit breaker unit 410 thereinside to selectively cut off only a specific PEBB from the converter 50.

On the other hand, the DC circuit breaker unit 310 and the AC circuit breaker unit 320 may also, of course, be provided at an outside of the PEBB in addition to the DC circuit breaker unit 400 and the AC circuit breaker unit 410 that are provided at an inside of the PEBB as shown above in (b) FIG. 4.

In this case, the DC circuit breaker unit 400 and the AC circuit breaker unit 410 provided at an inside of a PEBB 300c may be used to circuitally cut off the specific PEBB 300c, and the DC circuit breaker unit 310 and the AC circuit breaker unit 320 at an outside thereof may be used to protect the converter 50 from a DC current at an overvoltage flowing into the converter 50 as a whole, or to protect the loads of the distribution grid 20 from an AC current at an overvoltage output from the converter 50 as a whole.

Figure 5:
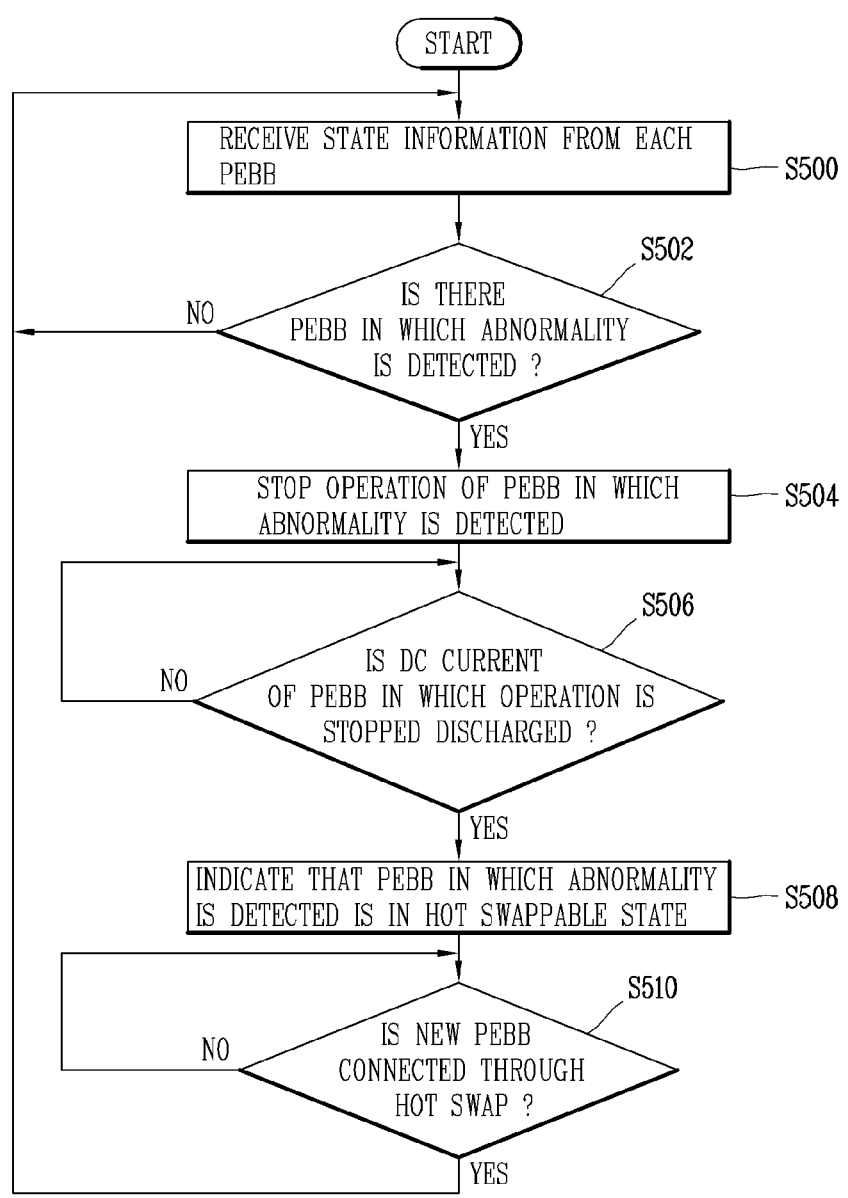
FIG. 5 is a flowchart illustrating an operation process of a system controller supporting hot swapping of inverters implemented in the form of PEBBs according to an embodiment of the present disclosure.

On the other hand, FIG. 5 is a flowchart illustrating an operation process of the system controller 30 of supporting hot swapping of inverters implemented in the form of PEBBs according to an embodiment of the present disclosure.

Referring to FIG. 5, the system controller 30 of the power conditioning system 40 according to an embodiment of the present disclosure may first receive state information from each PEBB connected thereto (S500). Here, the state information, which is information on the operating state of each PEBB, may be information for notifying whether each PEBB is in a state in which a normal operation is enabled. For an example, the state information may be information on which each PEBB has checked the state of an inverter or a circuit breaker built therein according to the control of the system controller 30 or according to a preset cycle.

Meanwhile, when state information is received from each PEBB, the system controller 30 may identify whether there is a PEBB in which an abnormality is detected based on the received state information (S502). Furthermore, when there is no PEBB in which an abnormality is detected, the step S500 of receiving state information from each PEBB according to a preset period or a preset condition may be performed again.

Meanwhile, when there is a PEBB in which an abnormality is detected as a result of the identification in the step S502, the system controller 30 may selectively stop the operation of a specific PEBB in which an abnormality is detected (S504). For example, the system controller 30 may control a DC circuit breaker and an AC circuit breaker provided at an inside of the PEBB in which an abnormality is detected to cut off the PEBB in which the abnormality is detected from the converter 50. Alternatively, the system controller 30 may control a DC circuit breaker and an AC circuit breaker provided at an outside of the converter to cut off the PEBB in which the abnormality is detected from the converter 50. Alternatively, the system controller 30 may selectively deactivate only the inverter of the PEBB in which the abnormality is detected to stop the operation of the inverter.

Meanwhile, when a PEBB in which an abnormality is detected is cut off or deactivated, the system controller 30 may detect whether a current stored in a capacitor of the PEBB in which the abnormality is detected has been discharged prior to displaying the PEBB in which the abnormality is detected to be replaceable (S506). Furthermore, subsequent to discharging the current stored in the capacitor of the PEBB in which the abnormality is detected, it may be displayed that the PEBB in which the abnormality is detected is in a replaceable state while the system is operating without stopping the entire system according to a hot swap method (S508).

For an example, subsequent to deactivating or cutting off the PEBB in the step S506, the system controller 30 may stand by for a predetermined time period to discharge a current stored in the condenser. Furthermore, when the predetermined time period elapses, it may be determined that the current stored in the capacitor of the PEBB in which the abnormality is detected is discharged to display that replacement according to hot swap is enabled. For example, the system controller 30 may display the replaceable PEBB to be distinguished from the other PEBBs through a monitoring device, or indicate that the PEBB determined to be replaceable is in a replaceable state using auditory information or visual information through an alarm unit or an optical output unit.

Furthermore, the system controller 30 may detect whether the PEBB in which the abnormality is detected is mounted again after the PEBB has been removed (S510). For example, when the first plug unit and the second plug unit coupled to the socket of the first bay and the socket of the second bay are separated therefrom, and then the first plug unit and the second plug unit are inserted into and coupled to the respective sockets, the system controller 30 may determine that a new PEBB is coupled thereto through hot swap. Then, the system controller 30 may proceed again to step S500, receive state information, including the newly coupled PEBB from each PEBB (S500), and detect whether there is an abnormal PEBB among the PEBBs coupled to the converter 50 (S502).

Meanwhile, the replacement of the PEBB in which the abnormality is detected may be a process of separating the first plug unit and the second plug unit of the PEBB in which the abnormality is detected from the sockets of the first bay and the second bay, and inserting the first plug unit and the second plug unit of a new PEBB into the sockets of the first bay and the second bay as described above. In this case, as described above, respective PEBBs may be driven independently of one another, and the system controller 30 may selectively cut off or deactivate the PEBB in which the abnormality is detected, thereby performing the replacement of the PEBB while the operation of the power conditioning system 40 is maintained. Accordingly, in the present disclosure, the replacement of the PEBB may be performed in a hot swap manner, that is, without stopping the operation of the power conditioning system 40.

On the other hand, even when some of the PEBBs are separated for abnormality or maintenance as described above, the operation of the power conditioning system according to an embodiment of the present disclosure may be continuously performed. However, since the number of inverters used is reduced when some of the PEBBS are separated therefrom as described above, a voltage of an AC current converted by the power conditioning system 40 may be decreased or a waveform abnormality of the AC current may occur. Accordingly, when some of the PEBBs are cut off or deactivated, the system controller 30 may control the operation of the remaining normally driven PEBBs to perform a compensatory operation for the cut-off or deactivated PEBBs.

Figure 6:
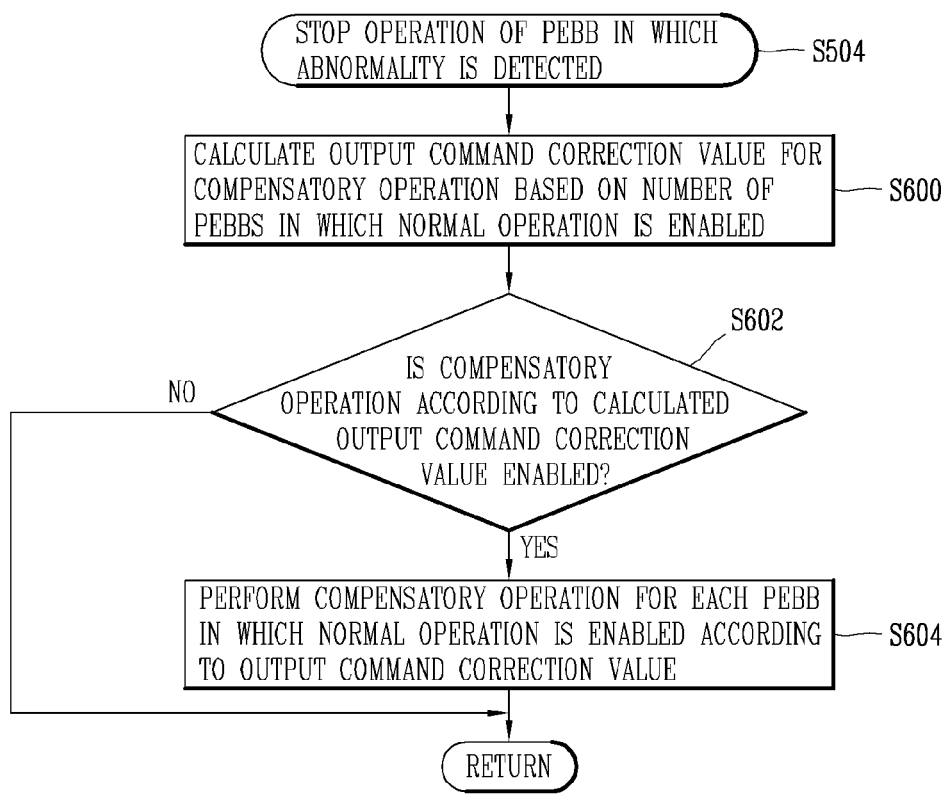
FIG. 6 is a flowchart illustrating an operation process of a system controller performing a compensatory operation when some of inverters implemented in the form of PEBBs are separated according to an embodiment of the present disclosure.

FIG. 6 is a flowchart illustrating an operation process of the system controller 30 that performs a compensatory operation when some of inverters implemented in the form of PEBBs are separated as described above according to an embodiment of the present disclosure.

Referring to FIG. 6, when the operation of the PEBB in which the abnormality is detected is stopped for the cut-off or deactivation of the PEBB in which the abnormality is detected in the step S504 of FIG. 5, the system controller 30 according to an embodiment of the present disclosure may calculate an output command correction value of each PEBB for compensatory operation for the PEBB in which the abnormality is detected based on the number of PEBBs in which normal operations are enabled and an AC current output of the power conditioning system 40 during a normal operation (S600). For an example, the system controller 30 may recalculate an on or off timing of PEBBs in which normal operations are enabled, thereby calculating an output command correction value for compensatory operation for the cut-off or deactivated PEBB.

Meanwhile, when the output command correction value is calculated, the system controller 30 may detect whether each PEBB is enabled for an operation according to the calculated output command correction value. For an example, the system controller 30 may detect whether an operation according to the output command correction value is enabled based on a maximum on-off switching timing and a minimum on-off switching timing of each of the remaining PEBBs in which normal operations are enabled. In addition, when the remaining PEBBs in which normal operations are enabled for an operation according to the calculated output command correction value, the remaining PEBBs may be driven (compensatory operation) according to the output command correction value (S604).

Meanwhile, such a compensatory operation may continue until replacement is completed according to the connection of a new PEBB in the step S510 of FIG. 5. That is, as a result of the detection in the step S510 of FIG. 5, when the connection of a new PEBB, that is, the replacement of a PEBB is completed, the system controller 30 may stop the compensatory operation, and restore an output command to control respective PEBBs to be driven according to the existing on/off switching timing.

Meanwhile, as a result of the determination in the step S602, when the remaining PEBBs in which normal operations are enabled are unable to operate according to the calculated output command correction value, the system controller 30 may not perform the compensatory operation. In this case, a voltage lower than a normal value or an AC current including a waveform abnormality may be output from the converter 50 until replacement is completed according to the connection of a new PEBB in the step S510 of FIG. 5. Meanwhile, the foregoing waveform abnormality may be corrected through an active filter (not shown) that removes harmonics.

The present disclosure described above may be implemented as computer-readable codes on a program-recorded medium. The computer-readable medium includes all kinds of recording devices in which data readable by a computer system is stored. Examples of the computer-readable medium include a hard disk drive (HDD), a solid-state disk (SSD), a silicon disk drive (SDD), a ROM, a RAM, a CD-ROM, a magnetic tape, a floppy disk, an optical data storage device and the like, and also include a device implemented in the form of a carrier wave (for example, transmission via the Internet).

In addition, the computer may include the controller. The above detailed description is therefore to be construed in all aspects as illustrative and not restrictive. The scope of the disclosure should be determined by reasonable interpretation of the appended claims and all changes that come within the equivalent scope of the disclosure are included in the scope of the disclosure.

The invention claimed is:

1. A power conditioning system comprising:
a converter comprising a plurality of inverters disposed in the form of power electronics building blocks (PEBBs); and
a system controller that controls the plurality of inverters to operate the plurality of inverters independently of one another, receives state information from each of the plurality of PEBBs, detects a specific PEBB requiring maintenance according to the received state information, deactivates an inverter of the specific PEBB separately from remaining PEBBs of the plurality of PEBBs when the specific PEBB is detected, and controls the operation of the remaining PEBBs to continuously operate the power conditioning system while the specific PEBB is deactivated,
wherein the converter comprises:
a first bay and a second bay, each comprising a plurality of sockets, and
wherein each PEBB comprises:
a first plug unit, coupled to a first socket of the first bay;
a second plug unit, coupled to a second socket of the second bay; and
an inverter that converts a DC current input through the first plug unit coupled to the first socket into an AC current, and outputs the AC current through the second socket coupled to the second plug unit,
wherein each socket of the plurality of sockets further comprises a locking device capable of fixing a coupling state of plug units coupled thereto, and
wherein when the specific PEBB is deactivated, the system controller controls a locking device of sockets coupled to the plug units of the specific PEBB to release a locked state so as to separate the plug units of the specific PEBB from the respective sockets.

2. The power conditioning system of claim 1, wherein the first plug unit and the second plug unit have different forms according to sockets corresponding thereto.

3. The power conditioning system of claim 1, wherein when the specific PEBB is deactivated, the system controller detects whether a current stored in the inverter of the specific PEBB is discharged, and controls the locking device to release the locked state when the current is discharged.

4. The power conditioning system of claim 3, wherein the system controller determines whether the current stored in the inverter of the specific PEBB is discharged based on whether a predetermined time period has elapsed from a time point when the specific PEBB is deactivated.

5. The power conditioning system of claim 1, wherein each PEBB further comprises:
a first circuit breaker unit between the first plug unit and the inverter to cut off a current input from the first plug unit; and
a second circuit breaker unit between the inverter and the second plug unit to cut off a current output from the inverter, and
wherein when the specific PEBB is detected, the system controller controls the first circuit breaker unit and the second circuit breaker unit of the specific PEBB to cut off the specific PEBB from the converter.

6. The power conditioning system of claim 1, wherein the converter further comprises:
a DC current circuit breaker unit capable of cutting off the DC current supplied to the converter from a DC power source; and
an AC current circuit breaker unit capable of cutting off the output of the AC current converted by the converter.

7. The power conditioning system of claim 1, wherein while the specific PEBB is deactivated, the system controller corrects an output command of the remaining PEBBs based on a number of the remaining PEBBs other than the specific PEBB and an AC output during normal operation of the converter to compensate the operation of the deactivated PEBB.

8. A method of controlling a power conditioning system having a converter comprising a plurality of inverters in the form of power electronics building blocks (PEBBs), the method comprising:
receiving state information from each of the plurality of PEBBs;
detecting a specific PEBB requiring maintenance based on the received plurality of state information;
stopping an operation of the specific PEBB to deactivate the specific PEBB;
correcting an output command of remaining PEBBs of the plurality of PEBBs for the operation based on a number of the remaining PEBBs other than the specific PEBB and an AC output during normal operation of the converter while the specific PEBB is deactivated; and
restoring the output command of the remaining PEBBs when replacement of the specific PEBB is completed,
wherein deactivating the specific PEBB further comprises:
detecting whether a current stored in an inverter of the specific PEBB is discharged; and
displaying the specific PEBB to be distinguished from the remaining PEBBs according to whether the stored current is discharged to indicate that the specific PEBB is in a replaceable state.

9. The method of claim 8, wherein detecting whether the stored current is discharged is the detecting of whether a predetermined time period has elapsed since a time point when the specific PEBB is deactivated.

10. The method of claim 8, wherein each PEBB comprises:
a first plug unit and a second plug unit;
an inverter that converts a DC current input through the first plug unit into an AC current, and outputs the AC current through the second plug unit;
a first circuit breaker unit between the first plug unit and the inverter to cut off the DC current input from the first plug unit; and
a second circuit breaker unit between the inverter and the second plug unit to cut off the AC current output from the inverter, and
wherein the deactivating of the specific PEBB further comprises the controlling of the first circuit breaker unit and the second circuit breaker unit to circuitally cut off the specific PEBB from the converter.

11. The method of claim 10, wherein the converter further comprises:
a first bay comprising a socket coupled to the first plug unit and a second bay comprising a socket coupled to the second plug unit,
wherein each of the sockets further comprises a locking device capable of fixing a coupling state of plug units coupled thereto, and
wherein the deactivating of the specific PEBB further comprises:
controlling of the locking device of sockets coupled to plug units of the specific PEBB to release a locked state so as to separate the plug units of the specific PEBB from respective sockets when the specific PEBB is in a replaceable state.

* * * * *